(12) United States Patent
Rahyer et al.

(10) Patent No.: US 6,980,645 B1
(45) Date of Patent: Dec. 27, 2005

(54) LOW-PASS FILTERING DEVICE WITH INTEGRATED INSULATOR AND PRIVATE INSTALLATION COMPRISING SAME

(75) Inventors: Alain Rahyer, Lannion (FR); Alain Bencivengo, Lannion (FR); Vincent Durel, Trebeurden (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 10/009,398

(22) PCT Filed: Apr. 21, 2000

(86) PCT No.: PCT/FR00/01071

§ 371 (c)(1),
(2), (4) Date: Mar. 13, 2002

(87) PCT Pub. No.: WO00/65819

PCT Pub. Date: Nov. 2, 2000

(30) Foreign Application Priority Data

Apr. 23, 1999 (FR) .................................... 99 05202
Jul. 1, 1999 (FR) .................................... 99 08509

(51) Int. Cl.[7] .......................................... H04M 1/738
(52) U.S. Cl. ...................... 379/394; 379/424; 379/442; 379/93.05; 370/488
(58) Field of Search .................. 379/93.07, 93.05, 379/394, 398, 767, 768, 794; 333/101, 767, 333/780

(56) References Cited

U.S. PATENT DOCUMENTS

| | | | |
|---|---|---|---|
| 3,703,610 A | 11/1972 | Lakin et al. | ................... 179/35 |
| 3,860,757 A | 1/1975 | Stewart | ................... 179/2.5 A |
| 5,025,443 A | 6/1991 | Gupta | ......................... 370/76 |
| 5,848,150 A | 12/1998 | Bingel | ......................... 379/399 |
| 6,477,249 B1 * | 11/2002 | Williamson et al. | ... 379/399.01 |

OTHER PUBLICATIONS

Cook et al., ADSL and VDSL Splitter Design and Telephony Performance; IEEE Journal; Dec. 1995; vol. 13, No. 9.

* cited by examiner

*Primary Examiner*—Xu Mei
*Assistant Examiner*—Walter F. Briney, III
(74) *Attorney, Agent, or Firm*—Patterson, Thuente, Skaar & Christensen, P.A.

(57) ABSTRACT

A filtering device for a narrow-band terminal in a private installation connected to an access network carrying narrow-band services (analogue or ISDN) and broad-band services (xDSL or HomePNA). The device has a low-pass filter associated with an insulation enabling the device to have a high input impedance insulating the installation when the narrow-band terminal is on hook while allowing the ringing signal to pass. Applicable to private telephone-teledata installations.

14 Claims, 11 Drawing Sheets

Resulting high impedance, independent of the number of devices

Resulting high impedance

Access network

Matched impedance

LOW-PASS FILTERING DEVICE WITH INTEGRATED INSULATOR AND PRIVATE INSTALLATION COMPRISING SAME

BACKGROUND OF THE INVENTION

The invention relates to a low-pass filtering device for a private installation connected to an access network carrying narrow-band services (analogue or ISDN) and broad-band services (xDSL or HomePNA) and the private installations including such devices.

1. Field of the Invention

Private installation means a Customer Premises Network (CPN). It starts at the terminal strip of the premises (NID, Network Interface Demarcation), and comprises all the cables, copper pairs and telephone sockets. It is connected (possibly via active equipment such as a PABX) to a network for access to narrow-band services and to broad-band services. It will in practice be a telephonic and teledata installation connected to the telephone network comprising one or more narrow-band terminals such as the telephone handsets, faxes, answering machines, modems or any other type of analogue or digital equipment (ISDN) and one or more broad-band terminals based on DSL or HomePNA technology.

Hereinafter the narrow-band terminals will be referred to by the abbreviation NBT and broad-band terminals by the abbreviation BBT.

Broad-band service means any service transmitted in a spectral band situated above narrow-band services (that is to say telephony or ISDN, frequencies higher than 10 kHz). Typically these are services delivered by the xDSL network, or based on purely private systems known as HomePNA, for example.

The term xDSL will be given to the broad-band services grouping together all the technological families such as SDSL, ADSL and ADSL-lite.

HomePNA is a Consortium set up in 1998 with a view to federating the specifications of transmission systems on telephone pairs: Home Phoneline Networking Alliance. By extension of this description, the so-called HomePNA systems will designate all transmission systems on a telephone copper pair, whether or not in conformity with the specifications of the HomePNA Consortium.

2. Description of the Related Art

The publications produced up to the present time relate exclusively to the following subjects:
  ADSL-lite and more generally the problems of distributed filtering and its impact on telephony;
  design of low-pass filters.
The publication researches emanating from the following bodies:
  UAWG: Universal ADSL Working Group
  ADSL-Forum
  ITU SG15Q4 International Telecommunications Union- Study Group 15-Question 4
Amongst the recommendations and standards relating to the technical field of the invention, there are the following:
  ITU-T:
  SG15/Q4: determination G.992.1 (ADSL modems),
  SG15/Q4: determination G.992 (ADSL-lite or Splitterless modems),
  SG15/Q4: determination G.996.1 (test procedures for evaluating performances of DSL systems),
  Recommendation Q.552 "Transmission characteristics at 2-wire analogue interfaces of digital exchanges".
  And of the
  ETSI:
  TBR21: Terminal equipment (TE); Attachment requirements for pan-European approval for connection to the analogue Public Switched Telephone Networks (PSTNs) of TE (excluding TE supporting the voice telephony service) in which network addressing, if provided, is by means of Dual Tone Multi Frequency (DTMF) signalling,
  TBR37: Draft EN 301 437 V1.1.1 (1998-09)—Terminal Equipment (TE); Attachment requirements for pan-European approval for connection to the analogue Public Switched Telephone Networks (PSTNs) of TE supporting the voice telephony service in which network addressing, if provided, is by means of Dual Tone Multi Frequency (DTMF) signalling.

The situation with the problem encountered by the applicant is as follows:

An IPC is connected to an access network. It makes it possible to deliver narrow-band services to the different NBTs.

This same IPC can be used for delivering broad-band services to one or more BBTs (either of the xDSL type, or a private LAN of the HomePNA type for example).

The simultaneous transportation of the two ranges of services on the same IPC is effected by a frequency multiplexing of the corresponding signals.

Frequency multiplexing of broad-band and narrow-band services on the same IPC is liable to require the use of a low-pass filter (or LPF in English terminology) in front of (or in) one or more NBTs in order to guarantee transparency between the two ranges of services (no mutual interference). The concept of distributed filters ('distributed LPF', or more generally 'distributed filter') is then evoked. This concept is detailed below:

The use of a number of filters which is a prior unknown and may change over time then poses problems of impedance mismatching between the TBE or NBTs and the private installation. For conventional telephony services, for example, this impedance mismatching results in an impairment of the phonic quality.

Bringing an ADSL modem into service conventionally requires the installation of a separator or splitter for narrow-band signals (analogue or ISDN services) and ADSL signals (broad-band services) at the input to the private installation. Each of the services is then routed separately over two distinct infrastructures (copper pairs) to the ad-hoc NBTs or BBTs (typically an ADSL modem).

During 1998 a new concept arose: "splitterless", which assumes an elimination of the signal separator. However, in the great majority of cases, it then becomes necessary to install low-pass filters before some or all of the NBTs, failing which the broad-band signals interfere with the telephony and vice-versa.

The concept of distributed filtering or "Distributed Filter" is then evoked. The essential aspect of this concept lies in the possibility for the client of installing the ADSL modem and the filters in an autonomous and simple fashion as illustrated by the diagram in FIG. 1A.

An example of a filter used in the prior art is illustrated in FIG. 1B. This is a filter sold by the company Excelsus.

In order to be viable such a solution requires compliance with the following points:

1. the use of distributed filters must preserve the quality of narrow-band service perceived by each NBT;

2. the use of narrow-band services must not interfere with the broad-band services carried by the ADSL signals (for example hanging up or picking up a telephone set), and vice-versa;
3. points 1 and 2 must be complied with whatever the number of filters installed in the private installation of the customer;
4. the type of filter used must be independent of the number of filters installed in the private installation of the customer;
5. the unit price of each filter must remain low.

When a filter is inserted in the private installation of the customer, it must not impair the retrieval of the narrow-band service. It must for example have an impedance matched to the access impedance of the NBT. An impedance mismatch results in an impairment of the parameters of retrieval of the analogue service, and therefore non-conformity with the specifications or recommendations current in the country in question.

In terms of voice services, for example, an impedance mismatch between an NBT and the telephone access causes a phenomenon of local echo, whose level is related to the degree of mismatching.

In the European recommendations and standards, for example, the NBTs (voice and non-voice) can have several types of impedance described in the ETSI publication: -TBR21 and TBR37.

At the international level, the recommendations and standards published by the ITU-T deal with the same points: recommendation Q.552 "Transmission characteristics at 2-wire analogue interfaces of digital exchanges".

These publications also describe the parameters for qualifying the narrow-band services, and give recommendations to be complied with in terms of "Return Loss", or insertion losses, and insertion loss distortion, etc.

Putting several filters in parallel in front of as many NBTs modifies the resulting impedance of the assembly formed by the private infrastructure of the customer (IPC) and the filters: "IPC+filters" seen at each of the NBTs.

The only exception to this rule is the so-called first order filters. This is a case of simple inductors. Putting several of them in parallel does not modify the resulting impedance at the IPC.

The drawback is as follows: the stiffness of a filter is as a first approximation n×6 dB per octave, where "n" is the order of the filter. The first order filters do not sufficiently protect the narrow-band services from the broad-band ones. In terms of telephony, a residual noise (hiss) is then perceptible.

For filters with an order greater than 1, one possible solution would consist of designing them so that the impedance seen by each NBT is matched to a given configuration. For example, if the installation of the customer requires the use of "n" filters, it is possible to manufacture a low-pass filter adapted to this particular situation: "n" filters installed in parallel on the IPC.

The drawback is then: the addition or removal of a filter changes the impedance of the whole, and leads to the situation described above: mismatched impedance between NBT and the assembly consisting of IPC and filters.

A new class of filter has also been proposed by B. Beeman-Siemens Telecom Networks. The objective sought for consists, for this technique, of modifying the impedance Z of the filter in order to limit the variation in the "Return Loss" level (measured here at 4 kHz) when the number of filters installed in parallel changes.

Each filter does not individually have an impedance strictly matched to the NBT, but the return loss varies little within the limit of a few given configurations.

This solution reduces the effect of the number of filters, but does not cancel it out completely.

It is not satisfactory since it does not guarantee compliance with the current recommendations in the different countries (for example ITU-T q; 552, or ETSI TBR21 and TBR37).

In conclusion, there does not exist at the present time any device for simultaneously reconciling the following aspects:
Preservation of the quality of the analogue or ISDN service or services,
Design of a single model of filter able to be installed before (or in) one or more NBTs, the total number of filters being indeterminate and variable over time.

OBJECTS AND SUMMARY OF THE INVENTION

The present invention makes it possible to remedy these drawbacks.

Its object is a filtering device for a narrow-band terminal in a private installation connected to an access network carrying narrow-band services (analogue or ISDN) and broad-band services (xDSL or HomePNA), principally characterised in that it comprises low-pass filtering means and isolation means enabling the device to have a high input impedance isolating it from the installation when the narrow-band terminal is on hook whilst allowing the ringing signal to pass.

According to a first embodiment, the filtering and isolation means can be functionally distinct.

The filtering means can include one or more distinct low-pass filters.

According to another characteristic, the isolation means comprise switching diodes in opposite orientations and disposed in parallel.

According to another characteristic, the isolation means comprise Zener diodes in opposite orientations and disposed in series.

According to another characteristic, the filtering means include a filter of the LC type, and the isolation means are placed at the inputs to the said filter.

According to another characteristic, the filtering means include a filter of the LC type and the isolation means are placed between the inductors and the capacitor of the said filter.

According to a second embodiment, the filtering and isolation means can be functionally interlinked.

According to one characteristic of this second mode, the filtering and isolation means include a low-pass filter, a diode bridge and at least one relay.

According to another characteristic of this second mode, the filtering means include a second order LC filter, the isolation means (I) are placed on each side of the capacitor of the said filter, the device also comprising at least two other capacitors (C') each being placed in parallel to the assembly formed by the isolation means and the capacitor of the filter.

According to a third embodiment which corresponds to an optional characteristic for the previous modes, the filtering means include a second order LC filter of high impedance, placed at the input of the device on the private installation side, and a second filter coupled to the first, whose activation depends directly on the isolation means.

The second filter includes a capacitor in parallel to the capacitor of the filter LC, the said capacitor being placed in the isolation means or after the said isolation means.

According to a preferential mode combining the variant of the second embodiment and the third embodiment, the isolation means are place after the capacitor of the LC filter, the capacitor of the second filter is placed in the isolation device and the other two capacitors are placed each in parallel to the assembly formed by the isolation means and the capacitor of the second filter.

Another object of the invention is a private installation comprising at least one narrow-band terminal, at least one broad-band terminal, connected to an access network carrying narrow-band services and broad-band services, characterised in that it includes at least one filtering device comprising low-pass filtering means and isolation means enabling the device to have a high input impedance isolating it from the installation when the narrow-band terminal is on hook whilst allowing the ringing signal to pass.

According to one embodiment, the filtering device is placed at the input of the narrow-band terminal on the access of the network or on the lead connecting the terminal to the network.

According to another embodiment, the device is placed in the narrow-band terminal.

BRIEF DESCRIPTION OF THE DRAWINGS

Other particularities and advantages of the invention will emerge from a reading of the description given below with regard to the accompanying drawings, in which.

DESCRIPTION FO THE PREFERRED EMBODIMENTS

Figure 2A:
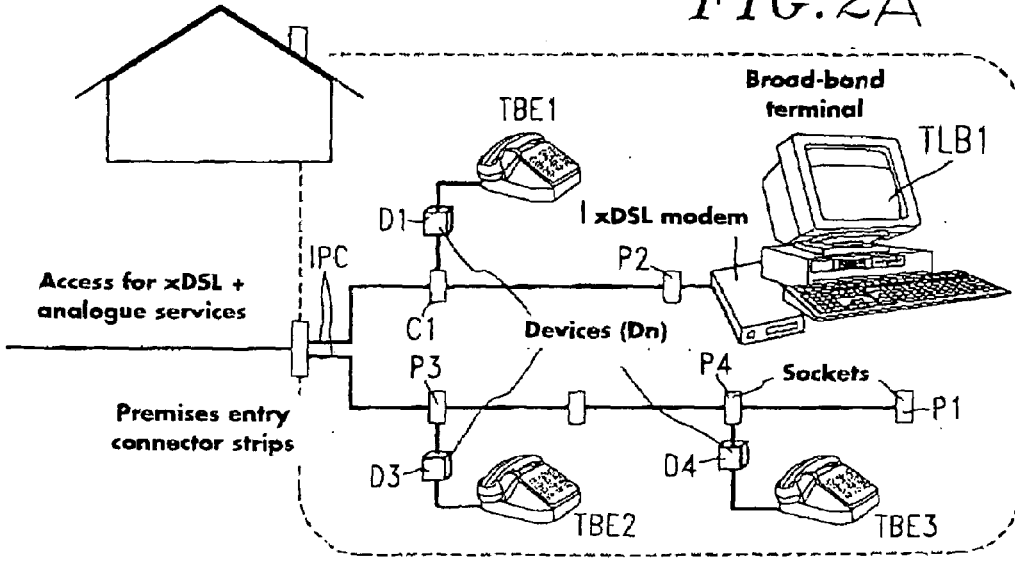
FIG. 2A depicts the diagram of a private installation comprising broad-band terminals, equipped with filtering devices according to the present invention.

As illustrated in the diagram in FIG. 2A, the filtering device can be independent equipment to be inserted in the private installation IPC in front of a narrow-band terminal NBT1, NBT2, NBT3 (for example between the wall socket P1 and the connector C1 of NBT1), or directly integrated into the NBT (for example in the lead, eg: NBT3, D3, or integrated into the terminal, eg: NBT4).

The device can also be installed so as to isolate several narrow-band terminals which would be connected simultaneously to this same device.

Figure 2B:
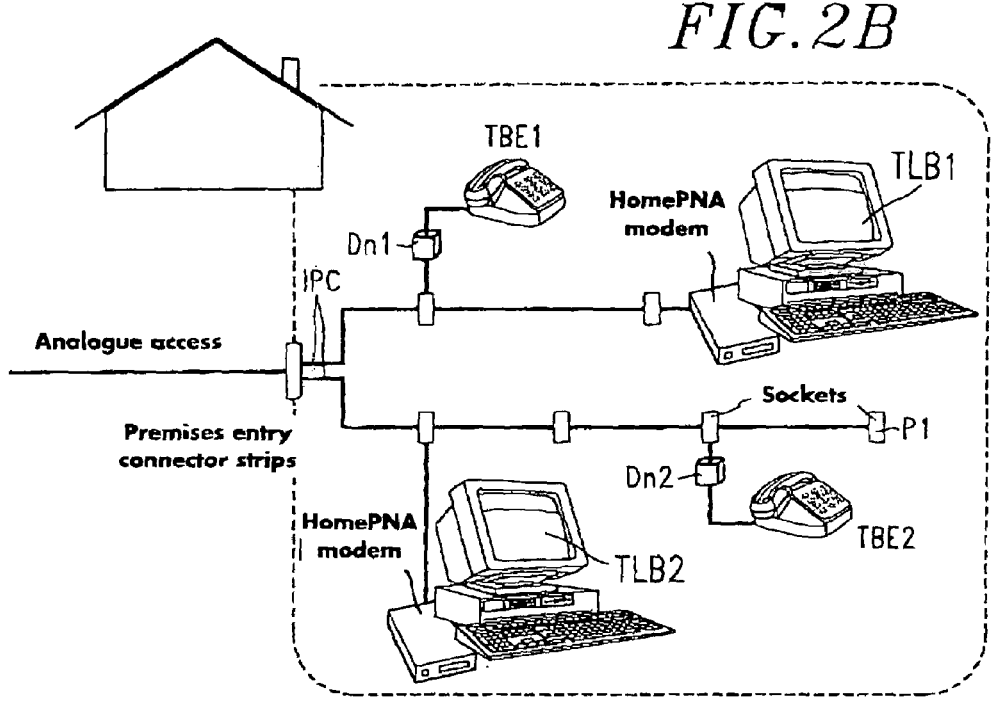
FIG. 2B depicts the diagram of a private installation comprising "HomePNA" systems, equipped with filtering devices according to the present invention.

In FIG. 2B, the filtering devices according to the invention make it possible to isolate the narrow-band terminal NBT1 of the installation with respect to the broad-band signals of the "HomePNA" systems BBT1 and BBT2.

A private installation can include, as illustrated by FIGS. 2A and 2B, a plurality of low-pass filtering devices with an integral isolator, placed in front of (or in) one or more terminals NBT of this private installation.

The filtering device according to the invention combines a low-pass filtering function F and an isolation function I of the filter when the associated terminal NBT is in an on-hook state.

The filtering and isolation functions can be physically distinct, which corresponds to a first embodiment of the invention (FIGS. 8A, 8B, 9, 11A, 11B) or interlinked, which corresponds to a second embodiment (FIG. 12) described later in the description.

The behaviour of the filtering device according to the invention is as follows:

When an NBT is off hook, the device behaves like a low-pass filter for the frequencies of the narrow-band service in question (analogue or ISDN) and has at the NBT an impedance which is matched to it.

When the NBT is on hook, the device isolates the filtering function.

When the NBT is on hook, the device does not prevent the transmission of the ringing current to the NBT (it is transparent to the ringing signal).

The device therefore guarantees transparency between the narrow-band services and the broad-band services (xDSL) whatever the number of terminals installed in the private installation IPC.

Advantageously, the device according to the invention does not call into question the type of configuration associated with the distributed filtering. In particular, the device can possibly be fitted by the customer himself according to the three alternatives already cited:

In the case of the terminal NBT1: the independent device is connected to the telephone socket;

In the case of the terminal NBT2: the device is inserted in the terminal lead;

In the case of the terminal NBT3: the device is integrated into the terminal.

Figure 3A:
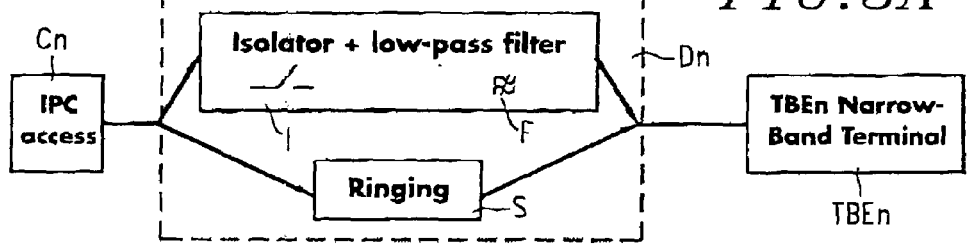
FIGS. 3A and 3B depict the outline diagram of the device according to the invention, the diagram of FIG. 3B being a variant of the principle depicted in FIG. 3A.
Figure 4:
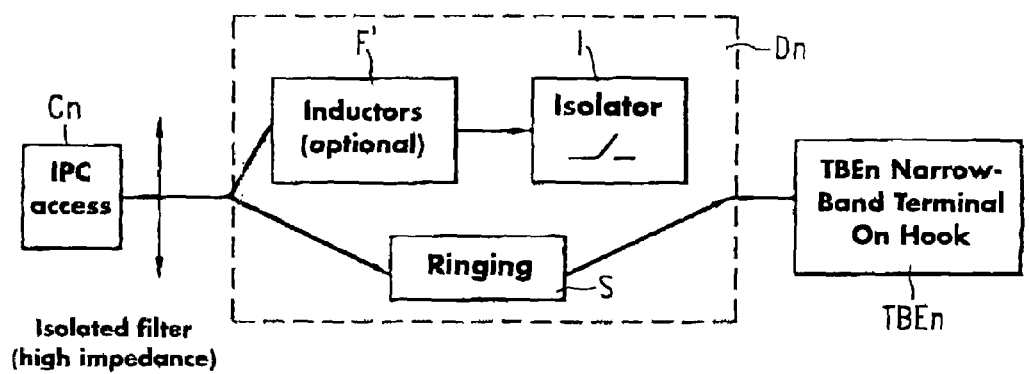
FIG. 4 depicts the operating diagram of the device when the narrow-band terminal (NBT) is on hook.
Figure 5:
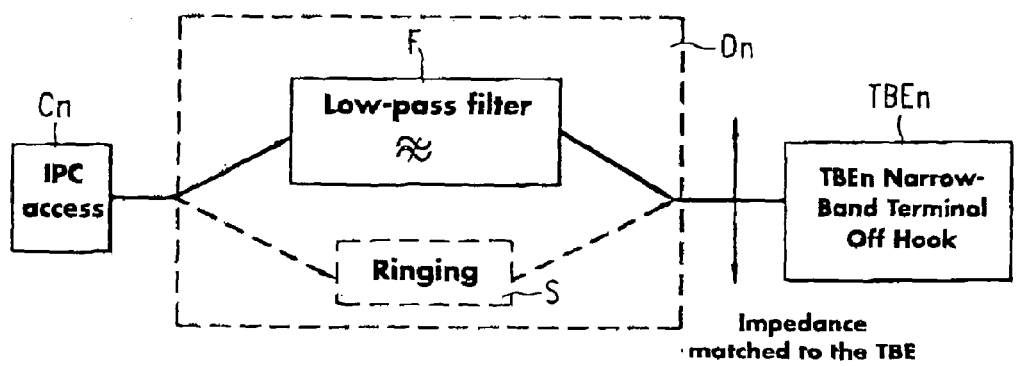
FIG. 5 depicts the operating diagram of the device when the narrow-band terminal (NBT) is off hook.

Reference will now be made to FIGS. 3A, 4 and 5 illustrating the functional diagrams of a filtering device Dn according to the invention.

The device Dn is connected to an access Cn of the telephone network (IPC).

The device has an isolator I associated with the low-pass filter F, leaving a channel for the passage of the ringing signal S.

The state of the device when the terminal TBn is on hook is illustrated by FIG. 4:

in this case the device isolates the low-pass filter from the rest of the installation IPC. The resulting impedance of the installation is therefore not affected by the presence of one (or more) devices.

The device does not interfere with the ringing current.

Provision can possibly be made for inserting inductors (equivalent to a first order filter F') in the device in front of the isolator I.

The state of the device when the terminal TBn is off hook is depicted in FIG. 5.

The device behaves like a low-pass filter for the frequencies of the narrow-band service in question (analogue or ISDN).

The device has an impedance which is matched on the terminal NBTn side for the same frequencies.

The device remains transparent to the ringing signal.

Figure 3B:
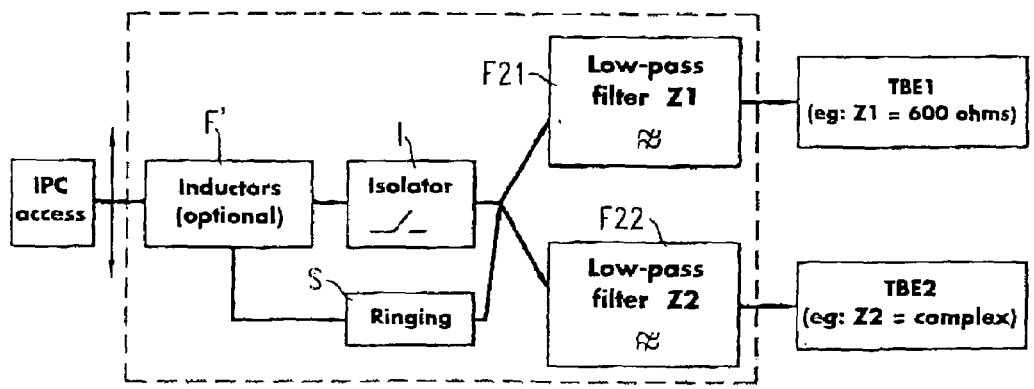

As can be seen in the variant of the outline diagram of FIG. 3B, it is also possible to design a device combining the 'Impedance isolator' function with several associated low-pass filters.

In this case the isolator acts overall on all the low-pass filters Fz1 and Fz2 which are attached to it: transparent when at least one NBT is off hook, and isolating when all the NBTs are on hook.

The low-pass filters can have distinct or similar impedances.

It is therefore possible to connect an NBT to each output of the device, provided that the impedance between the NBT is matched to that presented by the output of the low-pass filter in question.

In some countries, the NBTs deployed may present themselves according to several types of impedance, for example telephone sets with an impedance of 600 ohms, and those with a complex impedance (eg those in accordance with TBR21).

This mode of presentation therefore makes it possible to design a 'dual' device: that is to say one having two low-pass filtering outputs whose output impedances represent the majority of the NBTs existing in the country in question.

According to the characteristics of the NBT, the user would then be invited to connect it to the appropriate output of the device: for example the 600 ohm matched output, or the output matched for a complex impedance.

The same concept can also be applied to the case of a device having several outputs corresponding to different types of low-pass filters (eg an output on a second order LPF, and another on a fifth order LPF).

For reasons of simplicity in the diagrams, the preferred embodiments in FIGS. 8A and 11A described below do not exhibit this concept, although they are adapted to such a design.

Figure 12:
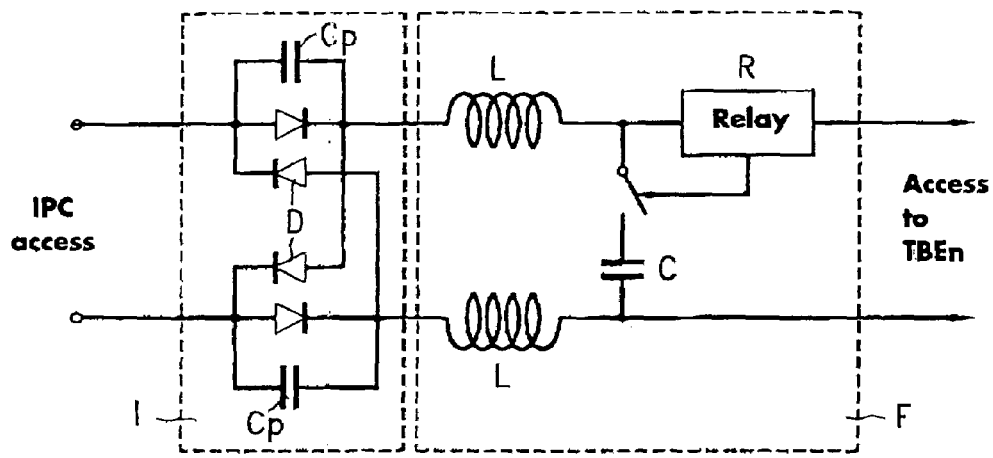
FIG. 12 depicts a diagram of a second embodiment of the device according to the invention.
Figure 13:
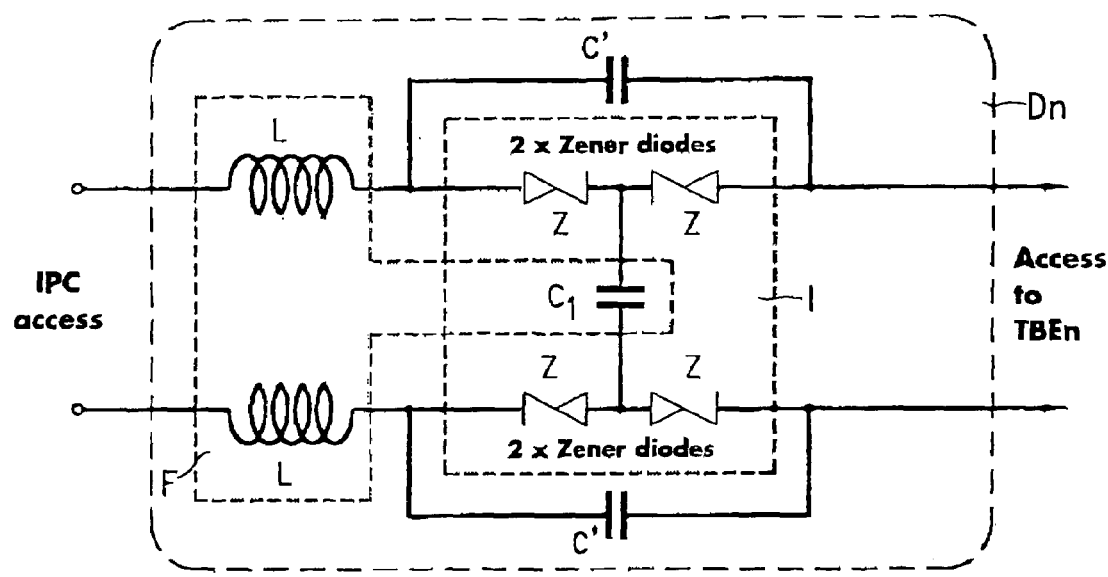
FIG. 13 depicts a second variant of the second embodiment.

On the other hand the second embodiment depicted in FIGS. 12 and 13 does not permit this.

Figure 6:
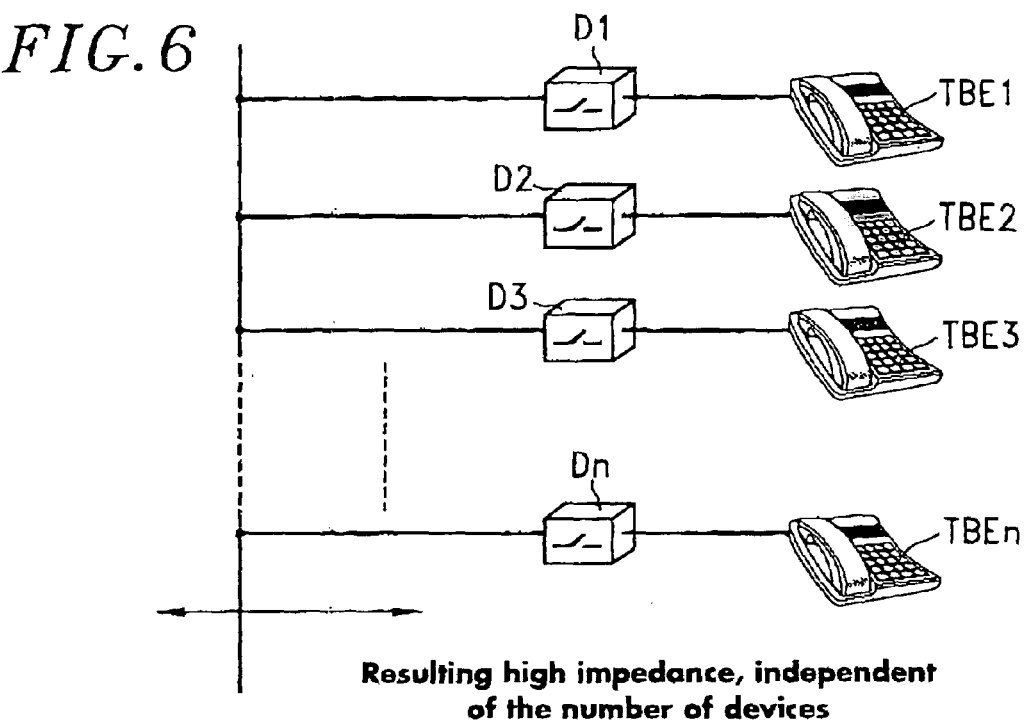
FIG. 6 depicts a diagram of an installation equipped with the device according to the invention in the case where all the narrow-band terminals are on hook.

FIG. 6 depicts a diagram illustrating the connection of several terminals NBT1–NBTn in the case where all the terminals are on hook. In this case, the impedance resulting from several on-hook devices is high and does not depend on the number of devices.

Figure 7:
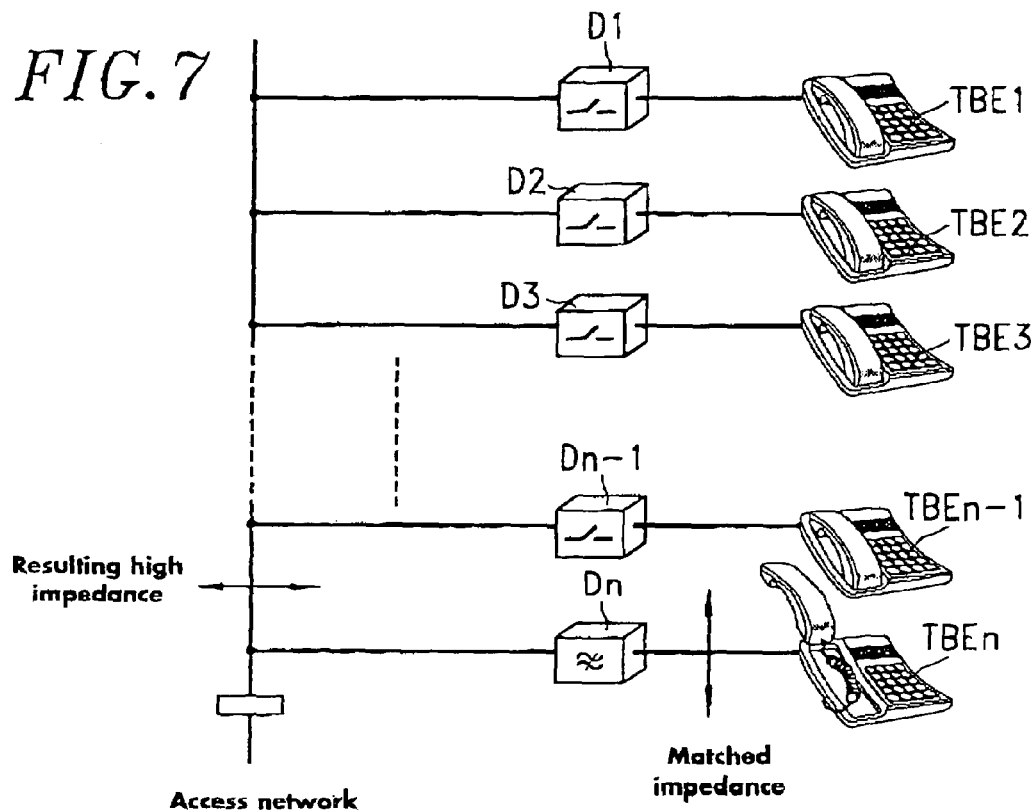
FIG. 7 depicts a diagram of an installation equipped with a device according to the invention in the case where a narrow-band terminal is off hook.

FIG. 7 illustrates an installation as depicted in FIG. 6 but in which a terminal is off hook, for example the terminal NBTn.

The associated device Dn acts as an adapted low-pass filter whilst the other devices D1–Dn-1 behave like isolators.

In order to perform the isolation and low-pass filtering functions of the device, several variants are envisaged in the remainder of the description for implementing the two embodiments illustrated in FIGS. 3A and 3B.

The diagrams given in FIGS. 8A, 8B, 9, 10, 11A, 11B illustrate these different possible variants of a first embodiment.

Naturally other assemblies of components can be provided for performing the functions described in accordance with the invention.

First Embodiment

Figure 8A:
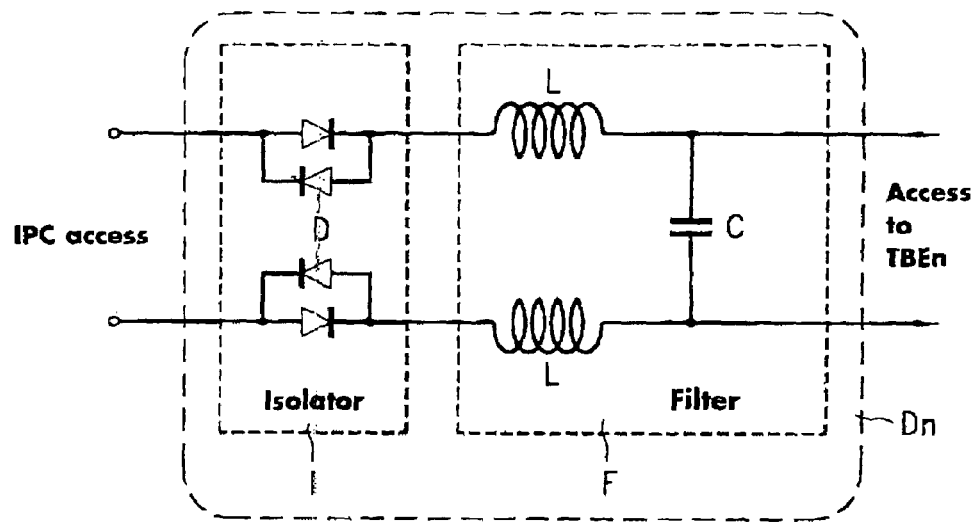
FIG. 8A depicts a diagram according to a first embodiment of the device of the invention in a first variant.

First Variant FIG. 8A:

The device comprises an isolator I with switching diodes D in opposite orientations and a low-pass filter F of order greater than 1.

The device can be produced by taking any type of low-pass filter LC of order greater than 1 or a different design.

It can be produced with different types of diodes and therefore by putting several diodes in series or by putting several diodes in parallel.

In FIG. 8A the filter F is a second order LC filter (the references L correspond to inductors and C to capacitors).

Inductors can be placed between the IPC access and the isolator, and in this case either they replace the first series of inductors of the filter or they are added to this first series.

Figure 8B:
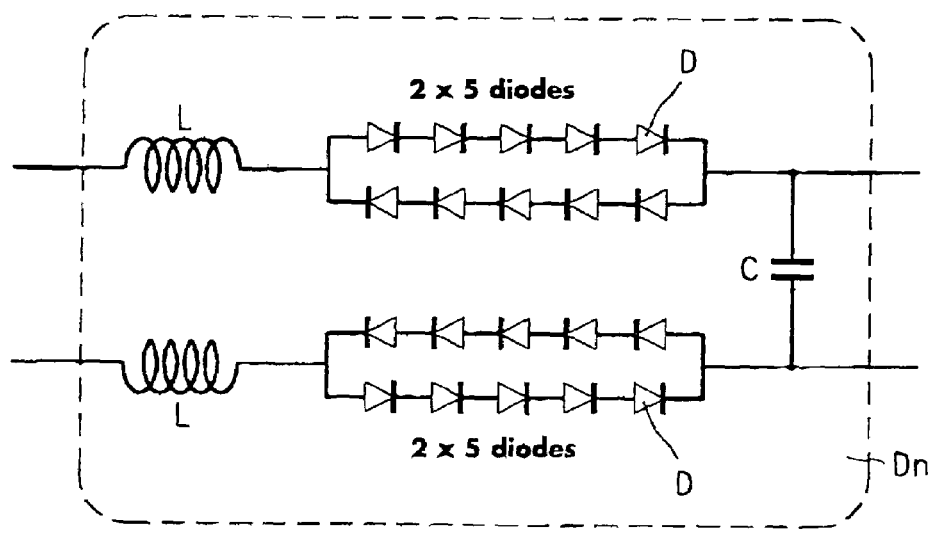
FIG. 8B depicts a variant execution according to FIG. 8A.

Second Variant FIG. 8B, as Produced:

Each switching diode of the 1N4148 type has a threshold voltage of approximately 0.6 V. The set of the series of 2×5 diodes in parallel therefore makes it possible to filter all signals with an amplitude of less than 3 V peak to peak when they are not biased (that is to say when the TBE is on hook).

The inductors L used have a value of 10 mH (millihenrys).

The capacitor C has a value of 4.7 nF (nanofarads).

Figure 9:
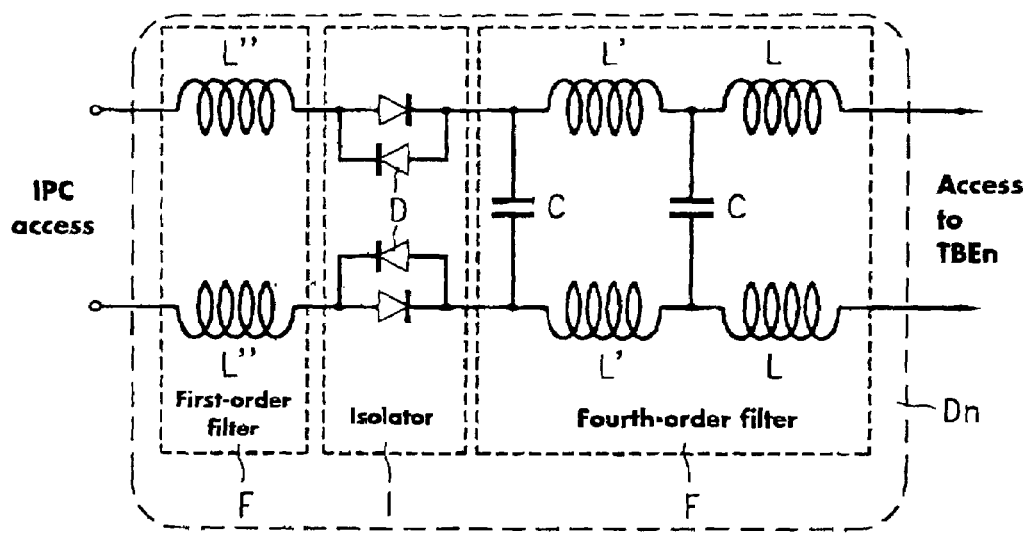
FIG. 9 depicts a diagram according to the first mode in a second variant.

The embodiment depicted in FIG. 9 corresponds to putting in cascade a filter F' of the first order LC type, followed by an isolator I with switching diodes in opposite orientations, followed by the fourth order LC-type filter.

When the terminal NBTn is off hook, the assembly behaves like a fifth order LC filter.

Figure 10:
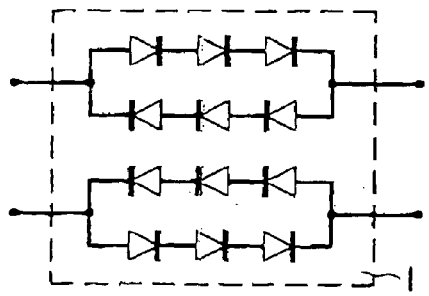
FIG. 10 depicts a diagram of a variant execution of the isolator.

FIG. 10 illustrates a variant embodiment for the isolator consisting of putting several diodes in series in order to increase if necessary the resulting threshold voltage. The isolator includes a bridge of switching diodes in opposite orientations on each input of the filter.

Third Variant: FIG. 11A:

The isolator consists of Zener diodes in opposite orientations disposed in series.

All the comments made in the previous embodiment also apply to this case (with the exception of those corresponding to FIG. 12).

In particular, it can be produced with different types of Zener diode, or by putting several Zener diodes in series in opposite orientations.

It is also possible to insert only one pair of Zener diodes provided that they are disposed in opposite orientations (both on the same wire or one on each wire).

Fourth Variant as Produced: FIG. 11B:

This device uses 10 mH inductors, a 14.7 nF capacitor and BZX85C Zener diodes with an inverse threshold voltage 8.2 V. Other values could have been used. The amplitude of the residual signal emitted by the broad-band system participates in the choice of the type of diodes.

The pairs of Zener diodes are inserted between the inductors and the capacitors, in a manner similar to the case of FIG. 9 (first-order filter placed before the isolator), in order to reduce the high-frequency noise.

The Zener diodes are mounted in opposite orientations on each wire of the telephone pair in order to take account of the polarity of the line. They can be disposed anode against anode or cathode against cathode indifferently on each of the wires.

Second Embodiment

First Variant: FIG. 12

A first variant of this second mode is depicted in FIG. 12.

In this case, the device comprises: an isolator I consisting of a diode bridge P (switching diodes D) and d' at least one relay R; and a second-order low-pass filter F comprising at least one capacitor C. The diode bridge P makes it possible to bias the current at the relay R:

The relay R opens the circuit of the capacitor C of the second-order filter F of type LC when the terminal NBTn is on hook. The device Dn then behaves like a first-order filter.

When the terminal NBTn is off hook, the relay R closes the circuit at the capacitor C of the second order filter LC. The device then behaves like a second-order filter.

In the example embodiment which has been made, capacitors Cp have been taken for the diode bridge of 1 microfarad. The diodes are 1N4148 diodes of 0.6 V. The inductances of the filters make 10 mH, and the capacitor C of the filter is of 14.7 nanofarads.

If the filter LC is of order greater than 2, it includes several capacitors, and the same design using a relay R can then be extended to each of the capacitors of the filter LC.

All types of relay may be used (for example: stemmed relay, photocouplers, photoFET, etc).

Second Variant: FIG. 13

A second variant of the second embodiment of the device is depicted in FIG. 13. It makes it possible more specifically to also respond to the following problem:

Certain operators have developed specific service ranges relating to telephony. These are for example message notification services or caller identification services, based on a format of the V23 type for example (referred to as Class services by the applicant France Telecom). The transmission of data in such services is distinguished by the fact that it takes place in the on-hook phase of the NBT.

For this purpose, the filtering and isolation means of the device in question must be transparent to the transmission of the messages associated with these services, whilst remaining in accordance with the characteristics of the device.

This variant of the device constitutes a solution meeting this specific requirement.

According to this variant, the filtering means include a second-order LC filter, the isolation means are placed on each side of the capacitor C1 of the said filter, and at least two other capacitors C' are placed in parallel to the whole. The values of the capacitors C' are calculated so as to remain transparent to the signals of the specific services in question (V23 for example).

When the NBT is on hook, the capacitors C' are transparent to the signals of the services in question, whilst the diodes isolate the capacitor C1 from the LC filter. The behaviour is in accordance with the previous variants described in on-hook phase.

When the NBT is off hook, the capacitor C1 becomes active, and the capacitors C' are short-circuited. The behaviour is also in accordance with the previous variants described in off-hook phase.

Third Embodiment

A description will now be given of a third embodiment relating to the first and second embodiments. This is a possible option for each of these modes making it possible to resolve the following problem:

The variant embodiments presented include diodes (for example Schotky diodes, or Zener diodes, see FIGS. 8A, 8B, 9, 10, 11A, 11B, 12 and 13). It has been assumed up till now that such diodes have negligible residual capacitances (for example below 10 pF, or a few tens of pF). In reality, it is possible or even likely for the components used to have not insignificant residual capacitances.

In such a case, the device is therefore liable to have a minimum of impedance in the frequency band of the broad-band services. This would result in a reduction in their performance.

To resolve this problem, it has been proposed to place at the input of the device (on the IPC side) a first second-order LC filter of high impedance, referred to as the input filter Fe. The filtering means are then modified in that they are now divided into two components:

On the one hand the input filter Fe, and on the other hand complementary filtering means Fc which depend directly on the isolation means.

Figure 14:
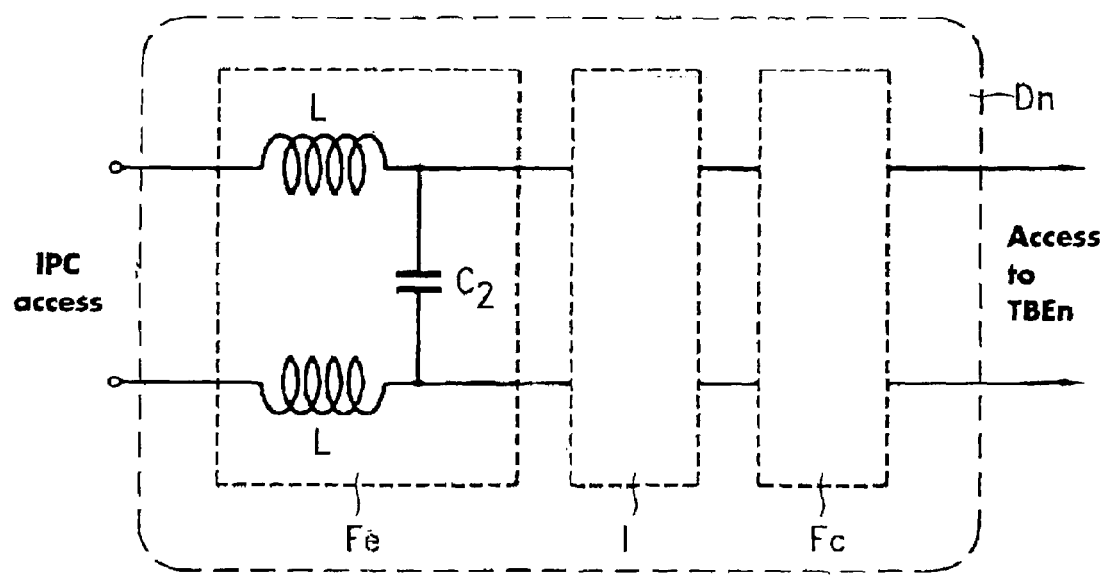
FIGS. 14 and 15 depict a third embodiment adapted respectively to the first and second modes.
Figure 15:
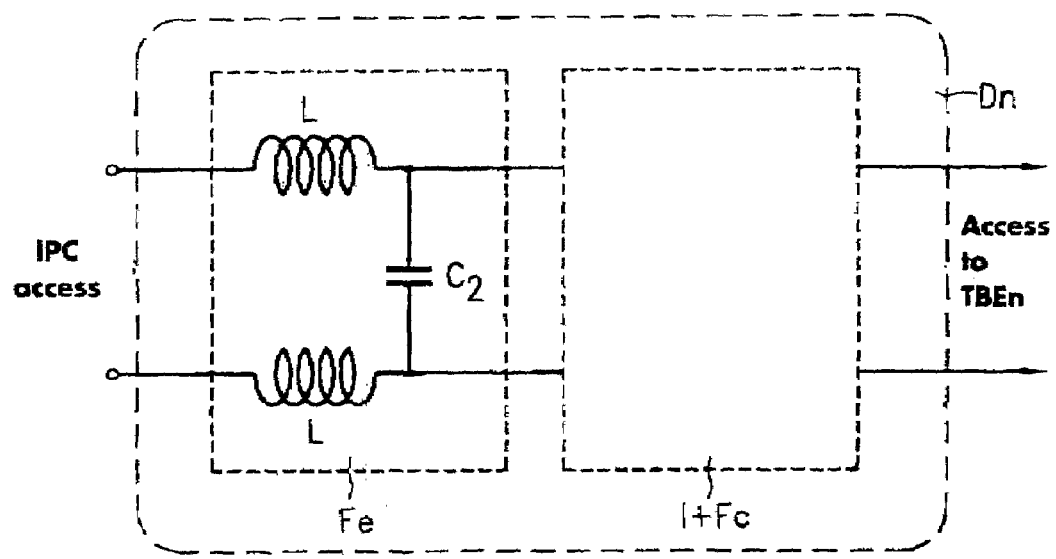

FIGS. 14 and 15 depict respectively the case relating to the first embodiment (isolator and filtering means functionally separate) and to the second embodiment (isolator and filtering means functionally interlinked).

Whatever the embodiment, when the NBT is off hook, the device behaves like a second order LC filter of high impedance, calculated so that the resonant frequency is typically situated between that of the broad-band services and that of the narrow-band services.

It is assumed that the value of the capacitor C2 of the input filter is very much greater than that of the residual capacitances of the components. In this way the residual capacitances of the various components of the device are masked, and in general terms the complementary filter Fc and the NBT.

When the NBT is off hook, the device behaves like a filter adding the components of the second order input LC filter or of the complementary filter.

Figure 16:
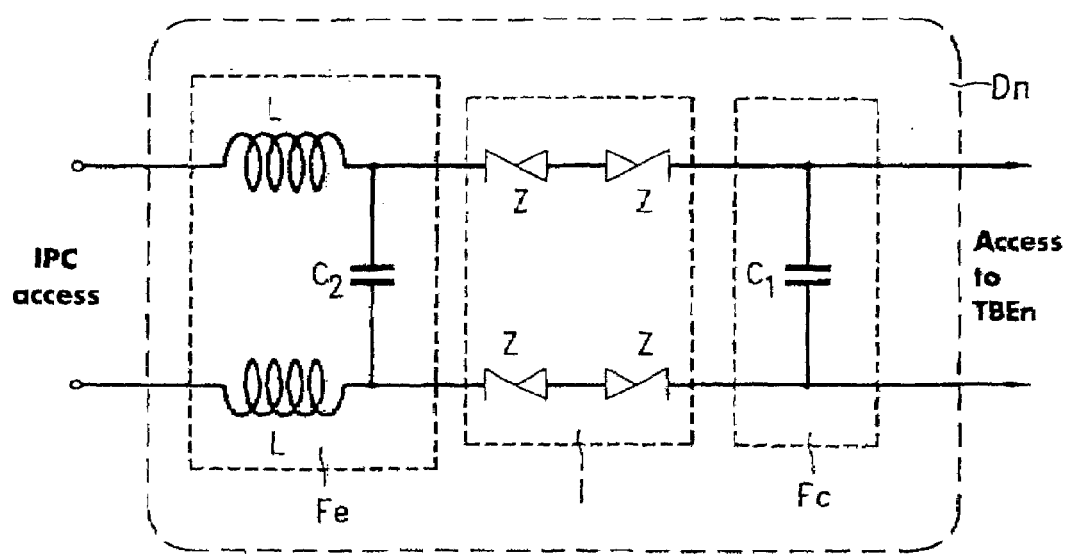
FIG. 16 depicts an example embodiment according to FIG. 14.

FIG. 16 shows an example based on the fourth variant of the first embodiment. An input filter has been added to this previous example. The complementary filter is a simple capacitor C1. When the NBT is off hook, the device then behaves like a second order LC filter, adding the capacitances C1 and C2.

The behaviour of this variant embodiment mitigates the existence of the residual capacitances of the components, notably of the diodes.

Putting several devices as described in parallel is in accordance with the requirements for the connection of a customer to an xDSL service already formulated at the start of the description.

Figure 1A:
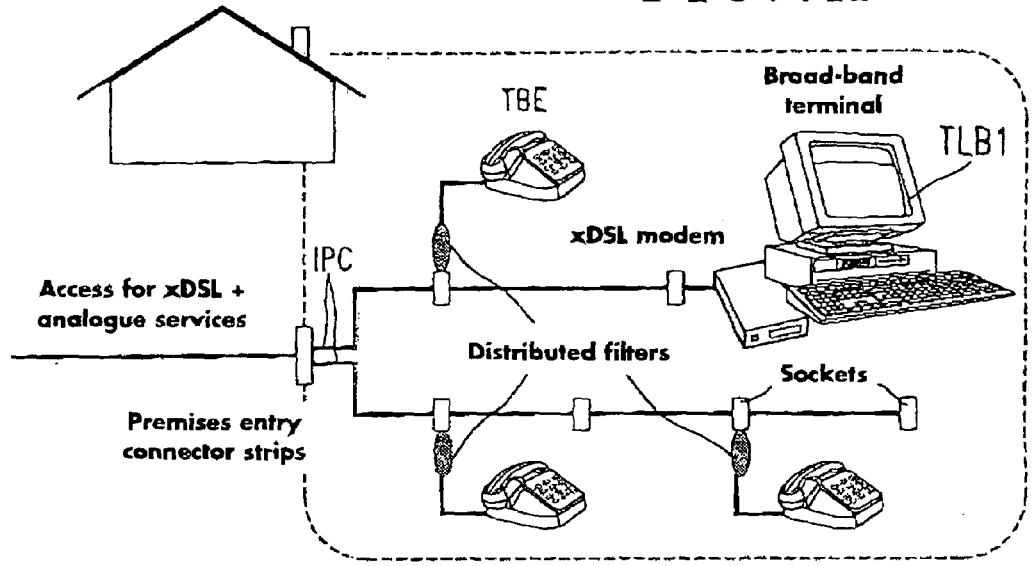
FIG. 1A depicts the diagram of a private installation equipped with distributed filters according to the state of the art.
Figure 1B:
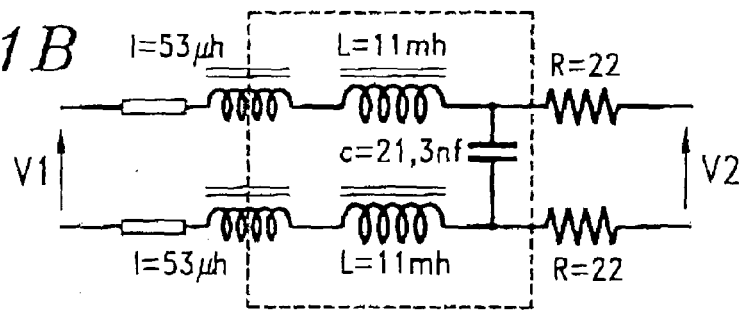
FIG. 1B depicts the diagram of a low-pass filter according to the state of the art (sold by Excelsus)

Several embodiments have been tested:
Embodiment with isolator with 5 diodes: FIG. 8B,
Embodiment with Zener diodes: FIG. 11B,
Embodiment with diode bridge and relays: FIG. 12.
They have been compared with different low-pass filters:
filters supplied by Alcatel: first order filters, simple inductance, L=7 mH
filters supplied by Cisco: 600 ohm adapted second-order filters, L=7 mH and C=35 nF
so-called 'Z-2400' filters (in accordance with the proposals of Bob Beeman-Siemens): second-order filters calculated here for an impedance of 2400 ohms, and produced by the inventors of this patent application, L=10 mH and C=4.7 nF
so-called 'Z-1200' filters (in accordance with the proposals of Bob Beeman-Siemens): second-order filters calculated here for an impedance of 1200 ohms, and produced by the inventors of this patent application, L=10 mH and C=14.7 nF
filters supplied by Excelsus: FIG. 1B.

They were tested on IPCs by varying the number of 'TBEs+device' (or filters) from 1 to 4, and by varying the cable length from the access network part (between the telephone exchange and the IPC input connector strip).

When several devices are inserted, the tests were carried out by activating (off hook) and deactivating (on hook) an NBT, the others all being deactivated (on hook).

The parameters tested are of several natures (list not exhaustive):
Input impedance presented at the NBT in different configurations
Return loss (or matching attenuation)
Electrical noise read on an oscilloscope between 0 and 10 kHz or between 0 and 100 kHz. Comparison of the three embodiments:
The device is in accordance with the supposed behaviour: when the associated NBT is on hook, it behaves like a first-order filter (like the one supplied by Alcatel). The number of the device in the IPC has no influence on the return loss. When the NBT is off hook the device of the variant in FIG. 12 behaves like a second-order filter.

It is however more expensive and complex to produce than the other prototypes: the cost of the photocoupler-relay and the diode bridge necessary for biasing the circuit.

The device of the variant in FIG. 8B is comparatively simpler and less expensive. This embodiment also has the advantage of being compatible with any type of low-pass filtering. It is also in conformity with the expected results.

The device of the variant in FIG. 11B represents at the present time a good compromise in terms of embodiment: cost and simplicity of manufacture (addition of only 4 Zener diodes), reliability (no relay etc), performance equivalent to the variant in FIG. 8B. It also has lower electrical noise.

It can however be improved by modifying it in accordance with the third embodiment (cf FIG. 16).

1) The phenomenon of "Return Loss" or matching attenuation:
The filters A (sold by Excelsus) and B (sold by Cisco) are distributed filters used in installations and which have been taken to show the improvement afforded by the device according to the invention.

The following table gives the Return Loss measurements on a filter access "on the NBT side" when the IPC comprises 4 filters.

The measurement is carried out on a 600 ohm junction set and on a short length of line (75 m).

| Frequencies (Hz) | Device Dn (FIG. 8B)(dB) | Filter A (dB) | Filter B (dB) |
| --- | --- | --- | --- |
| 300 | 17.67 | 16.72 | 15.06 |
| 800 | 17.38 | 18.77 | 15.37 |
| 1000 | 17.22 | 16.15 | 11.33 |
| 1500 | 17.26 | 12.92 | 8.59 |
| 2000 | 17.18 | 13.31 | 6.45 |
| 2500 | 16.64 | 7.92 | 4.37 |
| 3000 | 15.58 | 5.61 | 2.16 |
| 3400 | 14.52 | 3.84 | 0.38 |

The phenomenon of "return loss" of the device varies little according to the frequency whereas with the two conventional filters degradation is observed.

Figure 17:
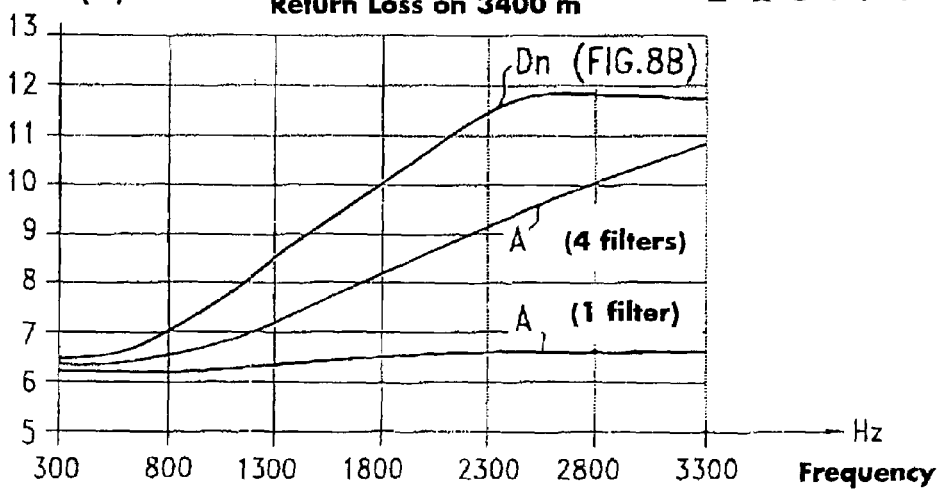
FIG. 17 depicts a diagram illustrating the matching loss in two distinct cases of the prior art and in a variant of the invention.

FIG. 17 shows the change in the return loss when the device or filter number changes from 1 to 4. The line length of the access network part is 3400 m in 4/10 cable. It should be noted that the curve corresponding to the variant produced with five diodes does not change, whilst the loss of filter A (Excelsus) plummets when changing from one to four filters on the IPC.

Figure 18:
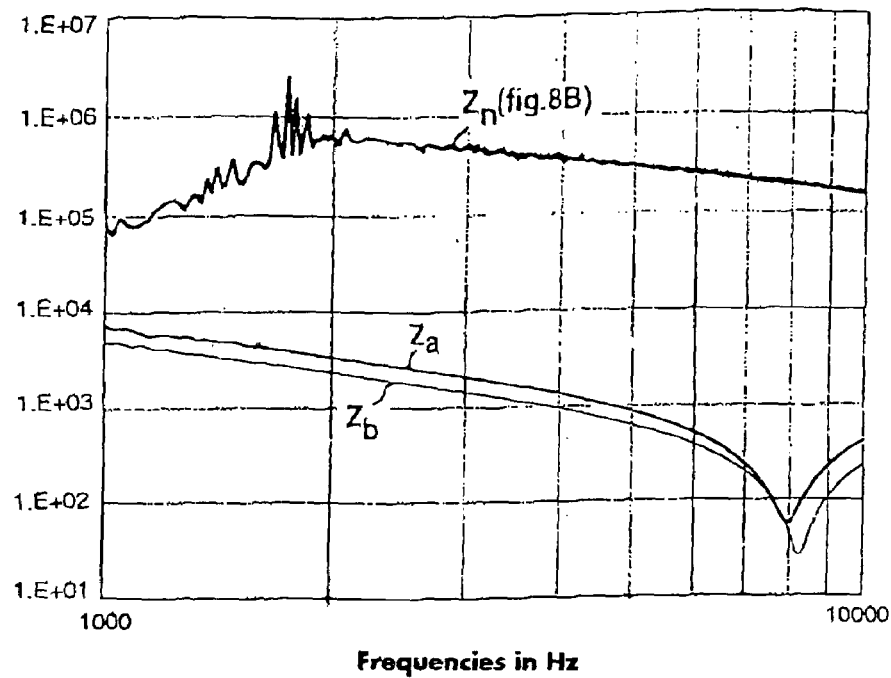
FIG. 18 depicts a diagram illustrating the input impedance curves of the filters in the case of the state of the art and in a variant of the invention.

2) Input Impedance:
The measurements of the input impedance of the device Dn and of the filters A and B when the terminal is on hook is illustrated respectively by the curves Zn, Za and Zb in FIG. 18.

It will be noted that, compared with the other two filters, the input impedance of the variant in FIG. 8B is very high and has no resonant frequency. It exhibits veritable isolation in the frequency bands below 10 kHz.

Figure 11A:
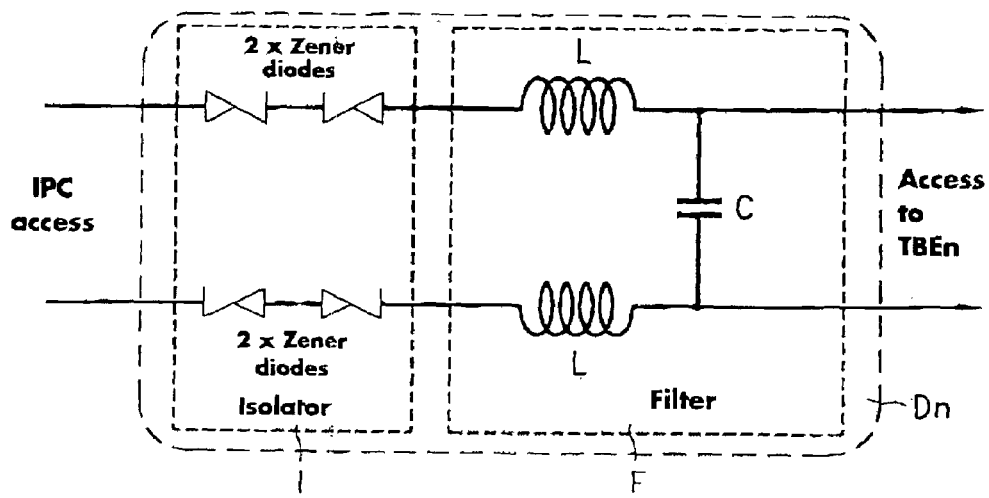
FIG. 11A depicts a diagram according to the first embodiment, of a third variant.
Figure 11B:
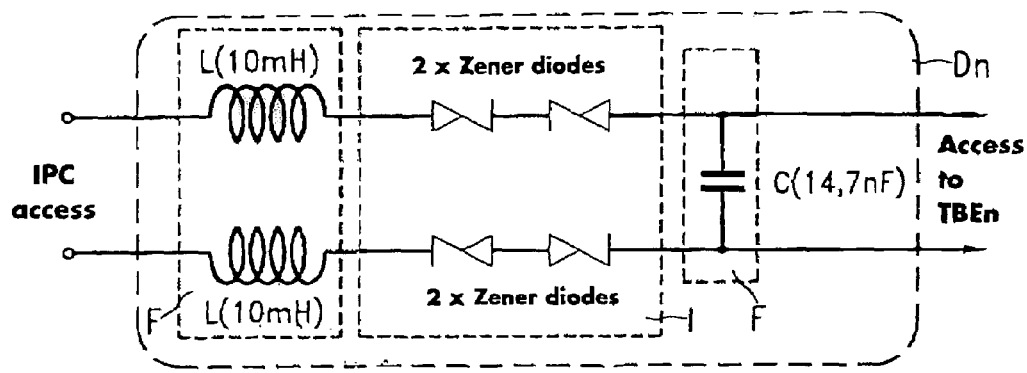
FIG. 11B depicts a diagram according to the first embodiment, of a fourth variant.

The input impedance of the variant in FIG. 11A is similar to that of the variant in FIG. 8B.

Thus the device according to the invention offers a low-pass filtering solution meeting the objectives fixed and set out below:
1. the characteristics or specifications of each device are identical whatever the number to be installed on the installation IPC;
2. the filtering between narrow-band signals (analogue or ISDN services) and broad-band signals (xDSL and HomePNA) does not depend on the number of devices installed on the IPC.
3. the levels of the parameters qualifying the narrow-band and broad-band services do not depend on the number of devices installed on the IPC.

Figure 19:
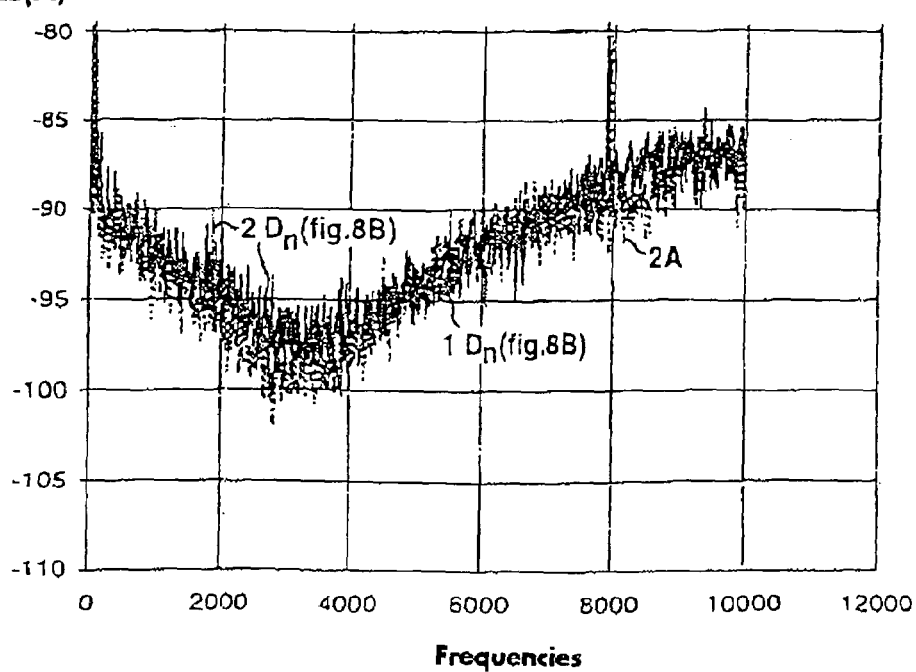
FIG. 19 depicts a diagram illustrating the noise curves at the output of the filters.

FIG. 19 gives a spectral reading of the electrical noise output from the device of the invention produced with five diodes and the filter A (Excelsus) in the 0–10 kHz band.

The embodiment in FIG. 11A has an electrical noise less than that of the embodiment in FIG. 8B and practically identical to that of the filter A (Excelsus).

Figure 20:
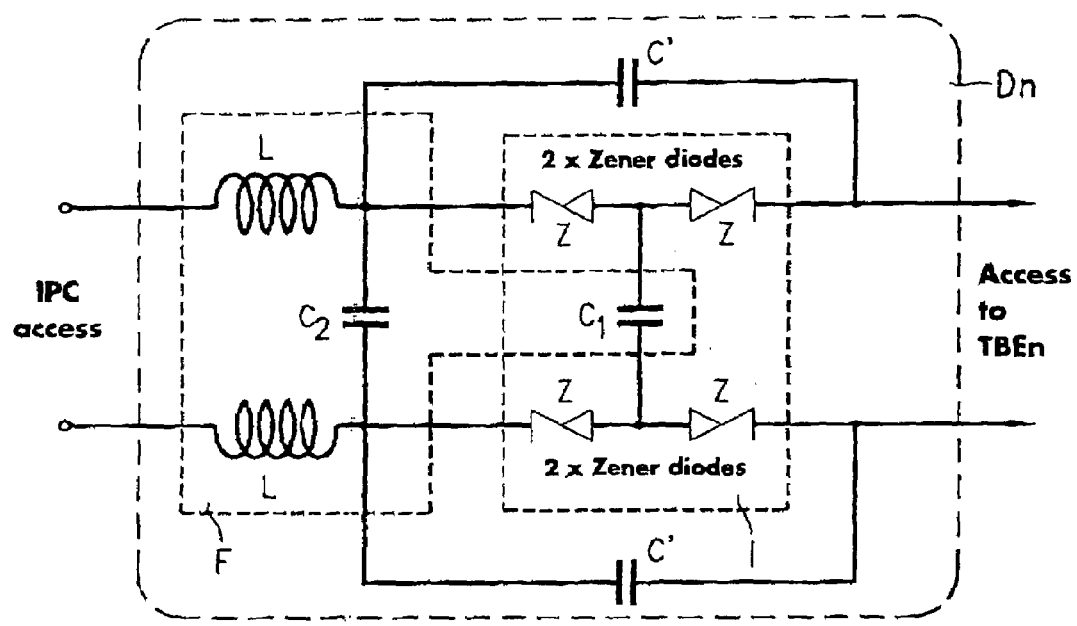
FIG. 20 depicts a preferential embodiment combining the second variant of the second mode (FIG. 13) and the third embodiment (FIG. 15).

A description will now be given of a preferential embodiment resulting from the combination of the second variant of the second embodiment and the third embodiment. This preferential mode is illustrated by the diagram in FIG. 20.

For the device which has been used the following examples have been taken by way of example:
2 inductors L each of 10 mH,
1 capacitor C1 of 14.7 nF,
1 capacitor C2 of 2.2 nF
2 capacitors C' of 1 pF.

By way of indication, other tests were carried out with C1=24 nF and C'=3 microF.

The "Dn Class device" is transparent to the specific services (identification of the caller, message notification etc). It does not degrade the performances of the broad-band services, and in general terms remains in accordance with all the characteristics set out above.

It represents the best compromise since the device must be transparent to the specific services mentioned in the third embodiment.

The following table gives the measurements of matching loss (in dB at the input of the IPC), where there are a device Dn (according to FIG. 20) and four devices (according to FIG. 20) in parallel before each of the terminals (cf. FIGS. 6 and 7).

| Freq (Hz) | 1 device Dn (FIG. 20) | 4 devices Dn (FIG. 20) |
|---|---|---|
| 300 | 17.43 | 17.56 |
| 500 | 17.05 | 17.15 |
| 1000 | 16.71 | 16.63 |
| 2000 | 16.67 | 15.94 |
| 2500 | 16.63 | 15.53 |
| 3400 | 15.86 | 14.38 |

What is claimed is:

1. A filtering device for a narrow-band terminal in a private installation connected to an access network carrying narrow-band services and broad-band services, comprising low-pass filtering circuitry and isolation circuitry, enabling the device to have a high input impedance isolating it from the installation when the narrow-band terminal is in the on-hook state while allowing the ringing signal to pass and the filtering circuit further including a first second-order LC filter of high impedance, placed at the input of the device on the private installation side and a second filter, the second filter being coupled to the first second order LC filter by the isolation circuitry, wherein activation of the second filter depends directly on the isolation circuitry.

2. A filtering device according to claim 1, wherein the filtering circuitry includes one or more low-pass filters.

3. A filtering device according to claim 1, wherein the filtering circuitry includes a filter of the LC type the filter comprising inductors and a capacitor and in that the isolation circuitry ms (I) are placed between the inductors and the capacitor of the said filter.

4. A filtering device according to claim 1, wherein the filtering and isolation circuitry are functionally distinct.

5. A filtering device according to claim 1, wherein the filtering and isolation circuitry are functionally interlinked.

6. A filtering device according to claim 5, wherein low-pass filter LC includes a capacitor and at least one relay controlling the bringing into service of the capacitor in the filter.

7. A filtering device according to claim 5, wherein the filtering circuitry include a second-order LC filter, and in that the isolation circuitry (I) are placed on each side of the capacitor of the said filter and in that it also comprises at least two other capacitors each being placed in parallel to the assembly formed by the isolation circuitry and the capacitor of the filter.

8. A filter device according to claim 1, wherein the second filter includes a capacitor in parallel to the capacitor of the LC filter placed in the isolation circuitry or after the isolation circuitry.

9. A filtering device according to claim 1, wherein the isolation circuitry are placed after the capacitor of the LC filter, and in that capacitor of the second filter is placed in the isolation device and in that the other two capacitors are each placed in parallel to the assembly formed by the isolation circuitry and the capacitor of the second filter.

10. A private installation comprising at least one narrow-band terminal and at least one broad-band terminal, connected to an access network carrying narrow-band services and broad-band services, characterised in that it includes at least one filtering device according to claim 1.

11. A private installation according to claim 10, wherein the device is placed at the input of the narrow-band terminal on the network access or on a lead connecting the terminal to the network.

12. A private installation according to claim 10, wherein the device is placed in the narrow-band terminal.

13. A filtering device according to claim 1, wherein the isolation circuitry comprises Zener diodes in opposite orientations and disposed in series.

14. A filtering device according to claim 8, wherein the isolation means is placed after the capacitor of the LC filter, and in that capacitor of the second filter is placed in the isolation device and in that the other two capacitors are each placed in parallel to the assembly formed by the isolation means and the capacitor of the second filter.

* * * * *